United States Patent [19]
Ulich et al.

[11] Patent Number: 5,267,329
[45] Date of Patent: Nov. 30, 1993

[54] PROCESS FOR AUTOMATICALLY DETECTING AND LOCATING A TARGET FROM A PLURALITY OF TWO DIMENSIONAL IMAGES

[75] Inventors: Bobby L. Ulich; John W. Montgomery, both of Tucson, Ariz.

[73] Assignee: Kaman Aerospace Corporation, Colorado Springs, Colo.

[21] Appl. No.: 565,424

[22] Filed: Aug. 10, 1990

[51] Int. Cl.$^5$ .......................... G06K 9/20; G06K 9/38
[52] U.S. Cl. ........................................ 382/48; 382/52; 364/517
[58] Field of Search ................. 356/3, 11, 12; 342/90, 342/91, 92; 382/1, 34, 48, 52, 41, 49; 358/88, 95, 99, 100, 103, 108, 109, 112, 113; 364/424.2, 433–435, 443, 516–517

[56] References Cited
U.S. PATENT DOCUMENTS

| | | | |
|---|---|---|---|
| 3,947,833 | 3/1976 | Eckstein, Jr. | 382/34 |
| 4,497,065 | 1/1985 | Tisdale et al. | 382/1 |
| 4,550,435 | 10/1985 | Hayman | 382/52 |
| 4,736,439 | 4/1988 | May | 382/52 |
| 4,739,401 | 4/1988 | Sacks et al. | 382/1 |
| 4,845,500 | 7/1989 | Cornett et al. | 340/90 |
| 4,862,257 | 8/1989 | Ulich | 358/109 |
| 4,920,412 | 4/1990 | Gerdt et al. | 358/95 |
| 4,964,721 | 10/1990 | Ulich et al. | 358/95 |
| 4,970,660 | 11/1990 | Marchant | 342/90 |

*Primary Examiner*—Ian J. Lobo
*Attorney, Agent, or Firm*—Fishman, Dionne & Cantor

[57] ABSTRACT

A novel data processing technique is provided for detecting and locating a target from a plurality of two-dimensional images generated by an imaging sensor such as an imaging lidar system. The present invention processes this series of two dimensional images (made with one or more imaging detectors) in an optimal statistical fashion to reliably detect and locate targets. This invention is a process by which the images are mathematically modified to reduce the deleterious effects of noise and thereby provide the highest possible probability of detection while simultaneously maintaining a very low probability of false alarm. The data processing technique described herein also provides an estimate of the reliability of the detection, the target location and an output image to be displayed for visual confirmation and perhaps classification by the operator. The method of the present invention includes some or all of the following steps: noise reduction, spatial filtering, noise parameter extraction, asymmetric threshold detection, contrast stretching, localization, recognition, range or depth determination and subimage mosaic generation. The present invention is particularly well suited for processing two dimensional images of underwater targets generated by an imaging sensor located on an airborne platform whereby the underwater target is precisely and accurately detected, located and identified.

19 Claims, 4 Drawing Sheets

PROCESS FOR AUTOMATICALLY DETECTING AND LOCATING A TARGET FROM A PLURALITY OF TWO DIMENSIONAL IMAGES

CROSS-REFERENCE TO RELATED APPLICATION

This application is related to:

(1) U.S. application Ser. No. 565,425 filed contemporaneously herewith entitled "Automatic Target Detection Process" and invented by Thomas L. Corwin, Henry R. Richardson, Michael V. Finn, F. Gregory Close Stanley Kuo, Tom A. Stefanick, R. Norris Keeler, Kent Pflibsen and Lonnie Calmes.

(2) U.S. application Ser. No. 565,480 filed contemporaneously herewith entitled "Physical Model for Automatic Detection Process" and invented by Thomas L. Corwin, Henry R. Richardson, Stanley Kuo, Tom A. Stefanick, Norris Keeler, Kent Pflibsen and Lonnie Calmes.

BACKGROUND OF THE INVENTION

This invention relates generally to a process for detecting and locating a target in a series of two-dimensional images generated by an imaging sensor. More particularly, this invention relates to a novel process for the detection and identification of targets through the use of computer image processing of data collected by an imaging sensor. This invention is particularly useful in the detection of underwater targets from an airborne platform.

Various imaging sensors are used to search areas (or volumes) for particular types of targets which may pose a threat. Examples of such targets include mines and submarines in the ocean, fixed-wing and rotary-wing aircraft, cruise missiles, and rockets in the air, and buried land mines under the soil. Such imaging sensors provide target images in two dimensions. Images in two dimensions can be made either using passive radiation or using active illumination at wavelengths ranging from microwaves, millimeter waves, infrared, and invisible to ultraviolet. These two dimensional images display signal intensity and its variation in two spatial dimensions. Gated cameras used to detect signal returns from pulsed sources (imaging radars or visible lidars) can resolve range from the sensor and therefore can spatially sample a volume in three dimensions. Potential targets within this search volume produce characteristic signatures in the series of images. Examples of imaging sensors exhibiting such target images include, for example, the imaging lidar systems described in U.S. Pat. No. 4,862,257 and U.S. application Ser. No. 420,247 filed Oct. 12, 1989 (now U.S. Pat. No. 4,964,721), both of which are assigned to the assignee hereof and incorporated herein by reference.

Imaging sensors of the general type described hereinabove typically have a display screen for viewing the detected images (e.g., targets). While a human operator viewing a display screen may provide a highly sensitive and reliable means of detecting targets, in some cases computer image processing will be superior. This is because the computer does not suffer from fatigue and inattentiveness as will be the case for human operators, especially in the environment of an aircraft such as a helicopter where noise, heat and vibration can distract from constant surveillance of the sensor display screen. Also, with multiple camera sensors, the visual data rate may be too high for a human to absorb and process effectively. Finally, the inherent complexity of spatial correlations and target signature correlations between images made at different times will require computer processing. Hence, there is a perceived need for computerized data processing techniques which will automatically (i.e., without human operator assistance) detect and locate preselected targets, particularly targets submerged underwater.

SUMMARY OF THE INVENTION

In accordance with the present invention, a novel data processing technique is provided for detecting and locating a target from a plurality of two-dimensional images generated by an imaging sensor such as an imaging lidar system. The present invention processes this series of two dimensional images (made with one or more imaging detectors) in an optimal statistical fashion to reliably detect and locate targets. This invention is a process by which the images are mathematically modified to reduce the deleterious effects of noise and thereby provide the highest possible probability of detection while simultaneously maintaining a very low probability of false alarm. The data processing technique described herein also provides an estimate of the reliability of the detection, the target location and an output image to be displayed for visual confirmation and perhaps classification by the operator. The method of the present invention includes some or all of the following steps: noise reduction, spatial filtering, noise parameter extraction, asymmetric threshold detection, contrast stretching, localization, recognition, range or depth determination and subimage mosaic generation.

The present invention is particularly well suited for processing two dimensional images of underwater targets generated by an imaging sensor located on an airborne platform whereby the underwater target is precisely and accurately detected, located and identified.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

While not limited thereto in its utility, the image processing techniques of the present invention are particularly well suited for use in conjunction with a novel imaging lidar system disclosed in U.S. patent application Ser. No. 565,631 filed Aug. 9, 1990 entitled "Imaging Lidar System" and invented by Charles H. Kaman, Bobby L. Ulich, Robert Mayerjak and George Schafer, said application being assigned to the assignee hereof and fully incorporated herein by reference. This imaging lidar system utilizes a pair of pulsed laser transmitters for increased power and six gated camera detectors.

The multiple lasers and cameras are optically boresighted to a scanning mirror for increased swath width perpendicular to the heading of the airborne platform.

Figure 1:
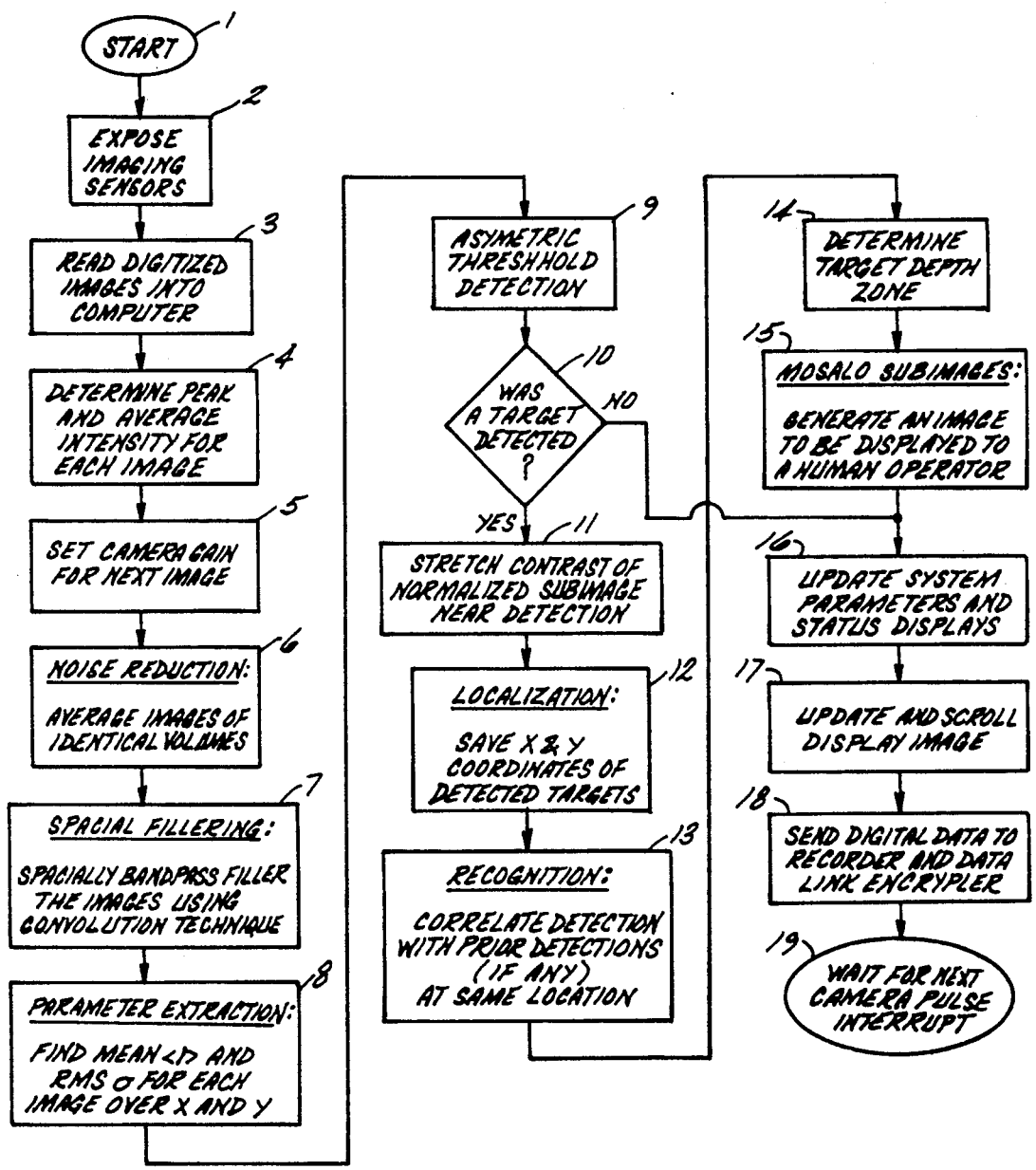
FIG. 1 is a flow chart depicting the image processing technique of the present invention.

The imaging processing flow chart in accordance with the present invention is shown in FIG. 1. Reference numeral 1 denotes the start or the initialization of the process. Step 2 is the generation of the images by exposing (e.g., gating) the sensor cameras such as are described in detail in the aforementioned patents and applications. In Step 3, the images are digitized and read into a computer. In Step 4, both the average and the peak intensities are determined for each separate camera image. In Step 5, the gains of the cameras are adjusted so that optimum intrascene dynamic range is achieved in the next exposure under the assumption that the scene brightness is unchanged. This prevents lack of sensitivity (e.g., gain too low) or saturation (e.g., gain too high). In Step 6, all images which are of the same scene are coregistered and averaged in order to reduce the background noise level. These multiple images may be derived from multiple exposures in a time series using one camera from simultaneously obtained images using multiple cameras. In Step 7, bandpass spatial filtering in two dimensions is used to enhance the target signature and to suppress unwanted high spatial frequency features (especially noise) and also low spatial frequencies (background signal). The bandpass spatial filtering can be easily implemented in digital form by replacing bipolar each pixel intensity value with the output of a two dimensional convolution calculation. This two-dimensional convolution is determined using the following equation (as described in Pratt, W. K., *Digital Image Processing*, John Wilex, New York, 1978, pp. 319-323).

$$Q(m_1,m_2) = \sum_{n_1=0}^{N} \sum_{n_2=0}^{N} F(n_1,n_2) H(m_1 - n_1 + 1, m_2 - n_2 + 1)$$

Where:
- $Q = M \times M$ output (convolved) image matrix
- $m_1$ = row number of Q matrix
- $m_2$ = column number of Q matrix
- $n_1$ = row number of F matrix
- $n_2$ = column number of F matrix
- $F = N \times N$ input image matrix
- $H = L \times L$ convolution matrix The convolution array for a spatial bandpass filter is typically of the form:

$$H = \begin{bmatrix} 1 & 1 & -3 & 1 & 1 \\ 1 & -3 & 2 & -3 & 1 \\ -3 & 2 & 4 & 2 & -3 \\ 1 & -3 & 2 & -3 & 1 \\ 1 & 1 & -3 & 1 & 1 \end{bmatrix}$$

In step 8, the mean and the standard deviation about the mean of the filtered intensities are determined using the following formulas (as described in Frieden, B. R. *Probability, Statistical Optics, and Data Testing*, Springer-Verlag, New York 1983, pp. 234, 246):

$$<F> = \frac{1}{N \cdot N} \sum_{n_1=0}^{N} \sum_{n_2=0}^{N} F(n_1,n_2)$$

and $$\sigma_F = \left[ \frac{\sum_{n=0}^{N} \sum_{n_2=0}^{N} \{F(n_1,n_2) - <F>\}^2}{(N \cdot N - 1)} \right]^{\frac{1}{2}}$$

Where
- $<F>$ = mean intensity of image matrix F
- $\sigma_F$ = standard deviation about the mean of image matrix F The result is a mean $<I>$ and RMS $\sigma$ for each image over the X and Y axes.

An important feature of this invention is Step 9 where symmetric or asymmetric threshold detection is performed. This process is shown in detail in FIG. 2 with reference to Steps 20-32. Each pixel intensity I is first scanned in Step 20 to see if it is higher (reflection) or lower (shadow) than the mean intensity value $\sigma$. In general, the background intensity level will not be zero. For the shadow case, if the signal I is more than $5\sigma$ below the mean, then the shadow is a probable target (Step 23). If the signal I is more than $3\sigma$ below the mean but less than $5\sigma$, then there is a possible shadow target (Step 25). If the signal I is found in Step 24 to be less than $3\sigma$ below the mean, then the signal I is judged to be due to noise and no detection is declared in Step 26. For signals brighter than the mean from the test in Step 21, a similar set of threshold comparisons is made. If the signal is more than $5\sigma$ higher than the mean in Step 27, a probable reflection detection is declared in Step 28. For signals from $3\sigma$ to $5\sigma$ higher in Step 29, a possible reflection target is declared in Step 30. Finally, if the signal is less than $3\sigma$ high in Step 29, it is declared to be noise (no detection) in Step 31. The output of this routine is then made available to the continuing processing of Step 32.

It will be appreciated that the $+/-3\sigma$ and $+/-5\sigma$ threshold values used herein as examples can be made asymmetrical (the plus and minus values would be unequal), and should be selected to produce the desired false alarm rate (especially the smaller threshold value). Reducing the threshold value will increase the false alarm rate, and increasing the threshold value will reduce the false alarm rate. Aysmmetrical threshold can in principle reduce the false alarm for asymmetrical noise sources (such as scintillation or other log normal distributions). The probability of false alarm can be calculated from the threshold value if the probability density function of the noise is known a priori using the following formula:

$$P_F = \int_{Z_1}^{\infty} P(Z/H_0) dZ$$

Where
- $Z_1$ = threshold value; and
- $P(Z/H_o)$ = probability density of photoelectron counts Z given the hypothesis $H_o$ that no target is present is true.

The above formula is described in Van Trees, H. L., *Detection Estimation, an Modulation Theory*, John Wilex, New York, 1968, pp. 23-31. For a gaussian probability distribution, for example $$P_F = \int_{Z_1}^{\infty} \frac{1}{\sqrt{2\pi}} \exp\left(\frac{-z^2}{2}\right) dz$$

Figure 2:
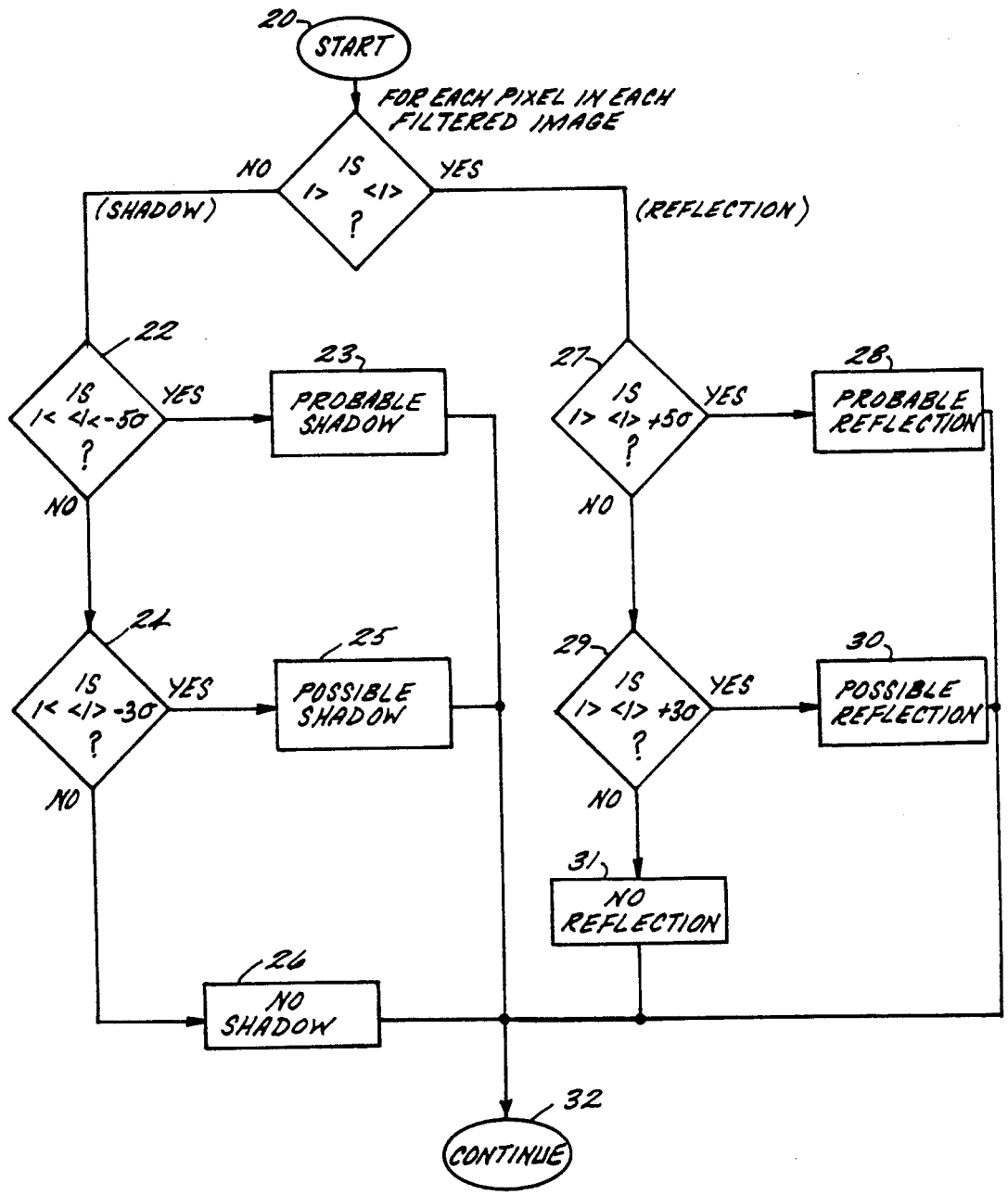
FIG. 2 is a flow chart depicting the asymmetric threshold detection system of the present invention.

Referring again to FIG. 1, the subroutine of FIG. 2 terminates at Step 10 which is the target detection test. If no target was detected by the process of FIG. 2, then the data processing method of this invention continues directly with Steps 16–19 which are self-explanatory "housekeeping" tasks including updating the system parameters and status display (Step 16); updating and scrolling the display image (Step 17); transmitting digital data to a recorder and data link encrypter (Step 18); and waiting for the next camera pulse interrupt signal (Step 19). Thereafter, the entire process is repeated when a new set of images has been obtained.

However, if a target was detected in Step 10, (either a probable or possible shadow or a probable or possible reflection), then Step 22 is performed wherein the part of the whole image near the target (hereinafter referred to as a "subimage") is stretched in contrast to provide the maximum amount of visual information when it is displayed to the operator in Step 17. In Step 12, the X and Y coordinates of the target image are determined using either the peak signal pixel location or an intensity centroid calculation. For peak signal location, the subimage matrix area is searched for the largest intensity value, and the row and column numbers of that pixel are used to estimate the target location. A more accurate target location estimate can be made using the following centroid calculations:

$$X = \frac{\sum_{n_1=0}^{N} \sum_{n_2=0}^{N} F(n_1, n_2) \cdot n_1}{\sum_{n_1=0}^{N} \sum_{n_2=0}^{N} F(n_1, n_2)}$$

$$Y = \frac{\sum_{n_1=0}^{N} \sum_{n_2=0}^{N} F(n_1, n_2) \cdot n_2}{\sum_{n_1=0}^{N} \sum_{n_2=0}^{N} F(n_1, n_2)}$$

Where
$\overline{X}$ = target centroid location in X coordinate
$\overline{Y}$ = target centroid location in Y coordinate Also, in Step 12, the absolute latitude and longitude of the target are calculated using the sensor platform navigation data (e.g., helicopter or other airborne platform navigational instruments) and a correction for the relative target location with respect to the aircraft by knowledge of the aircraft altitude and compass heading, the target depth, the roll and pitch angles of the sensor line of sight, and the angular offsets of the target image within the sensor field of view, the relative latitude and longitude of the target can be calculated with respect to the aircraft.

The target latitude $\Phi_T$ and longitude $\theta_T$ can be found from the following equations:

$$N = \cos^{-1}[\cos(P) \cdot \cos(R)]$$

$$r = (A + d/n) \cdot \sin(N)$$

$$\theta_R = \tan^{-1}\left[\frac{\tan(R)}{\sin(P)}\right]$$

-continued
$$\Phi_T = \Phi_A + \frac{r \cdot \cos(c - \theta_R)}{R_E}$$

$$\theta_T = \theta_A - \frac{r \cdot \sin(c - \theta_R)}{R_E \cdot \cos(\Phi_T)}$$

Where:
P = Sensor lien of sight pitch angle (+ is forward)
R = Sensor line of slight roll angle (+ is to left)
n = Sea water index of refraction (1.34295)
N = Sensor line of slight nadir angle
r = Horizontal separation of aircraft and target
A = Aircraft altitude
C = Aircraft compass heading (+ is clockwise from North)
$\theta_R$ = Angle of plane containing sensor line of sight and nadir with aircraft heading direction (+ is counter-clockwise from heading)
$\Phi_A$ = Aircraft latitude
$\theta_A$ = Aircraft longitude, and
$R_E$ = Radios of Earth.

In Step 13, previous detection records are checked to see if a prior detection was made at the same location (within the accuracy of the navigation system). If such multiple coincidence detections have occurred, then the estimated probability of detection will be increased. Thus, two estimates of "possible" detections may be upgraded to a "probable" detection.

Figure 3:
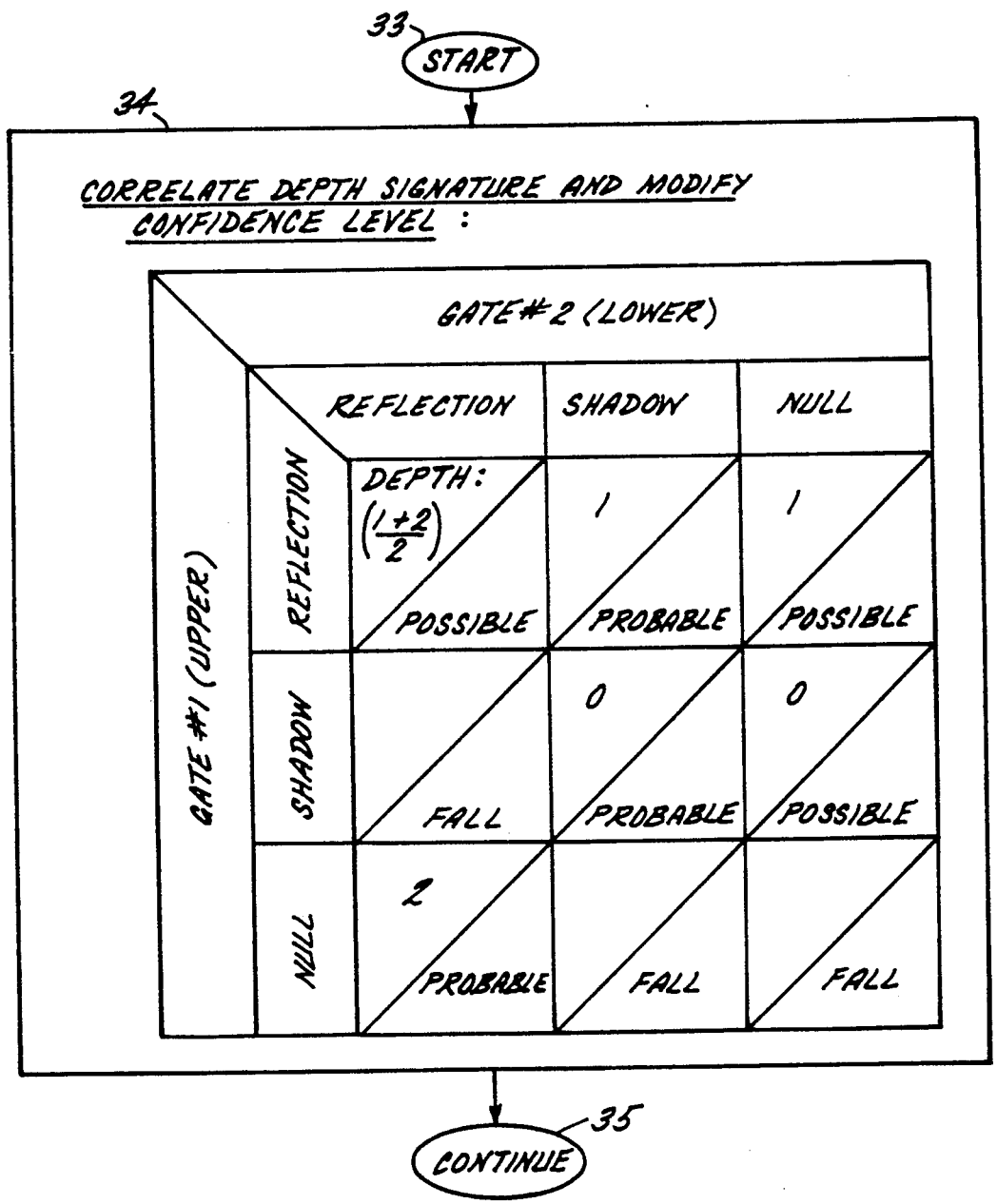
FIG. 3 is a flow chart depicting a system for determining target depth.

For imaging lidar sensors such at the Imaging Lidar System of U.S. Pat. No. 4,862,257 or U.S. Ser. No. 565,631, the target range of depth may also be determined in Step 14, which is shown in detail in FIG. 3. Referring now to FIG. 3 and beginning with Step 33, each detection is composed of images made in two range gates, one of which is either just above or just below the range gate in which the target is located. Targets in the range gate will generally be brighter than the background (reflection mode). Targets in front of the range gate will be seen in double shadow/obstruction (shadow mode). Targets behind the range gate will of course not be detected. The truth table in Step 17 compares the target modes in two adjacent range gates for consistency and for determining the actual target range or depth. "Fail" means an untypical, inconsistent result which cannot be a real target signature. The numbers inside the boxes in Step 34 represent the target location. The "2" means within Gate #2 (the lower one), "1", is within Gate #1 (the upper one) and "0" means the target is closer to the imaging sensor than either of the two gates. The boxes in the table in Step 34 also indicate the confidence in the reality of the target detection based on the consistency of the shadow/reflection signature observed.

Figure 4:
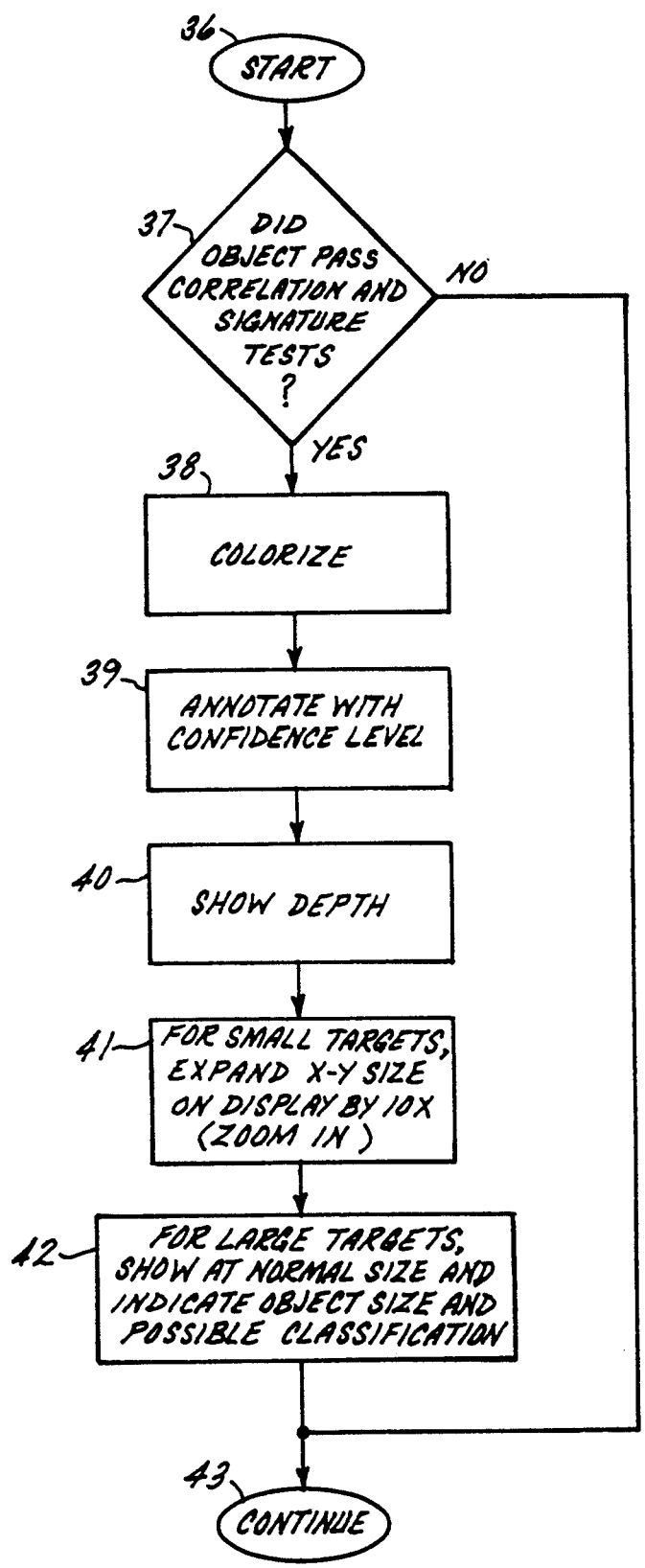
FIG. 4 is a flow chart depicting a system for generating mosaic subimages.

Referring again to FIG. 1, Step 15 has now been reached where subimages are assembled to form a larger montage or composite image for display and transmittal purposes. FIG. 4 (Steps 36–43) is a detailed flow chart of step 15 in FIG. 1. Upon starting in Step 36 in FIG. 4, objects that pass both the temporal correlation tests (e.g., Was it detected more than once?) and the signature tests (e.g., Is it a spurious background feature?) are processed further. The subimages may be enhanced using known false color techniques (Step 38), annotated to indicate whether the computer has determined a possible or a probable detection (Step 39), shown at their proper depth (or range) either using alphanumerics or by use of a pseudo—3 D display (Step 40) and/or enlarged to show details on small objects (such as mines) even through the sensor display may show a very large field of view (Step 41). For instance, small target images can be enlarged by, for example, a factor of 10. That is, the displayed image is "zoomed in" by a factor of 10. Each target, however, is shown at its correct location on the sensor display so that spatial relationships with other image features are maintained correctly. For large targets or for a series of contiguous small targets, Step 42 displays a larger subimage with no magnification. This would be appropriate for a submarine, for instance. Finally in Step 42, a possible target classification is indicated (for instance, mine or submarine) based upon target size and shape.

Returning again to FIG. 1, after creating the mosaic of subimages in Step 15, the data processing techniques of this invention proceed to update the operator display with sensor health and status data (alphanumerics). In Step 17, the mosaic image is added to the display screen and scrolled appropriately if the sensor platform is moving to match the apparent target velocity. In Step 18, the target data (such as processed subimage, two or three dimensional location and estimated Probability of detection) are recorded and also sent over a data link to a remote location for secondary review and classification.

Finally, in Step 19, the progress goes into a "wait" state until the next images are obtained at which time the data processing technique of FIG. 1 is repeated again to process the new images beginning with Step 1.

The data processing technique described herein is readily understandable by those of ordinary skill in the art and can be easily implemented using existing computer technology. It will provide a reliable and robust target detection, location and classification capability for high data rate imaging sensors such as television cameras, forward looking infrared (FLIR) sensors and imagaing lidars.

Additional image processing may allow amelioration of the degrading effects of particle distribution inhomogeneities and surface wave focussing/defocussing of the laser beam as it is transmitted into the water. For instance, one picture obtained just below the water surface could be saved, scaled, spatially smoothed to compensate for multiple scattering effects and subtracted from all images at greater depths to remove the laser irradiance variations which limit the target detectability.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for processing a plurality of two dimensional camera images of a target, the images being comprises of a plurality of pixels with each pixel having a particular pixel intensity and all of the images further having been generated by an active imaging sensor, the active imaging sensor comprising at least one pulsed light transmitter and at least one range gated camera receiver, the method comprising the steps of:
   (1) digitizing the camera images;
   (2) calculating the mean and the standard deviation about the mean of the camera images; and
   (3) determining whether a target was detected using threshold detection analysis based upon the calculated mean and standard deviation about the mean;
wherein step (3) further comprises the steps of:
   (4) determining if each pixels intensity in each image is lower than a selected intensity value defining a potential target shadow or higher than a selected intensity value defining a potential target reflection;
   (5) determining if the potential target shadow is an actual target or due to noise by comparing said pixel intensity to a range of first preselected threshold values in the event that each pixel intensity in each image defines a target shadow; and
   (6) determining if the potential target reflection is an actual target or due to noise by comparing said pixel intensity to a range of second preselected threshold values in the event that each pixel intensity in each image defines a target reflection.

2. The method of claim 1 including:
calculating the average and peak intensities for each camera image; and
adjusting the gain of the at least one camera subsequent to calculating the average and peak intensities wherein optimum intrascene dynamic range is achieved in the next camera exposure.

3. The method of claim 1 including the step of:
reducing the noise level of the camera images.

4. The method of claim 3 wherein said noise reduction step further comprises:
coregistering and averaging all images which are of the same scene wherein background noise level is reduced.

5. The method of claim 1 including the step of:
spatially filtering the camera images.

6. The method of claim 5 wherein said spatial filtering step further comprises:
filtering the camera images to enhance any target signature and suppress undesired high and low spatial frequencies.

7. The method of claim 6 wherein said filtering step further comprises:
bandpass spatial filtering wherein each pixel intensity value is replaced with the output of a two dimensional spatial convolution calculation.

8. The method of claim 1 wherein:
said first preselected threshold values are equal to said second preselected threshold values, but have opposing signs defining symmetric values.

9. The method of claim 1 wherein:
said first preselected threshold values are not equal to said second preselected threshold values defining asymmetric values.

10. The method of claim 1 including the step of:
determining the probability of false alarms as a function of the first and second preselected threshold values and as a function of the probability density function of the noise.

11. The method of claim 1 wherein a target has been detected in the camera images and including the steps of:
stretching in contrast a portion of the image near the target defining a subimage.

12. The method of claim 1 wherein a target has been detected in the camera images and including the step of:
determining the X and Y coordinates of the target.

13. The method of claim 12 wherein:

said X and Y coordinates are determined using either the peak signal pixel location or an intensity centroid calculation.

14. The method of claim 1 wherein the imaging sensor is located on an airborne platform having onboard navigational instruments and including the step of:
determining absolute latitude and longitude of the target using onboard navigational instruments and a correction for the target location relative to the airborne platform.

15. The method of claim 12 including the step of:
correlating the target location with previous target detections in the same location to increase probability of detection.

16. The method of claim 1 wherein a target has been detected in the camera images and including the step of:
determining target depth zone.

17. The method of claim 16 wherein the step of determining target depth zone comprises:
comparing images from at least two adjacent range gates and determining which range gate target is present as a function of whether the target is a shadow or reflection or not present in each of the adjacent range gates.

18. The method of claim 1 wherein a target has been detected in the camera images and including the step of:
combining subimages of the target into a composite mosaic.

19. A method for processing a plurality of two dimensional camera images of a target, all of the images having been generated by an active imaging sensor comprised of at least one pulsed light transmitter and at least one range gated camera receiver and being located on an airborne platform having onboard navigational instruments, comprising the steps of:
(1) digitizing the camera images;
(2) analyzing the digitized camera images to determine whether a target was detected; and
(3) determining target depth zone wherein the step of determining target depth zone comprises;
comparing images from at least two adjacent range gates and determining which range gate target is present as a function of whether the target is a shadow or reflection or not present in each of the adjacent range gates.

* * * * *

UNITED STATES PATENT AND TRADEMARK OFFICE
CERTIFICATE OF CORRECTION

PATENT NO. : 5,267,329
DATED : November 30, 1993
INVENTOR(S) : Bobby L. Ulich et al.

Page 1 of 1

It is certified that error appears in the above-identified patent and that said Letters Patent is hereby corrected as shown below:

Column 4,
Line 5, delete "n=0" and insert therefor -- $n_1=0$ --

Column 5,
Line 36, delete "X" and insert therefor -- $\overline{X}$ --
Line 41, delete "Y" and insert therefor -- $\overline{Y}$ --

Column 6,
Line 6, after "sensor", delete "lien" and insert therefor -- line --
Line 11, after "of", delete "slight" and insert therefor -- sight --
Line 13, after "of", delete "slight" and insert therefor -- sight --
Line 23, after "$R_E$=", delete "Radios" and insert therefor -- Radius --

Column 7,
Lines 59 & 60, after "being", delete "comprises" and insert therefor -- comprised --

Signed and Sealed this

Fifth Day of March, 2002

Attest:

Attesting Officer

JAMES E. ROGAN
Director of the United States Patent and Trademark Office